United States Patent
Latham

(10) Patent No.: US 8,057,170 B2
(45) Date of Patent: Nov. 15, 2011

(54) INTERMEDIATE CASING FOR A GAS TURBINE ENGINE

(75) Inventor: Peter Latham, Bristol (GB)

(73) Assignee: Rolls-Royce PLC, London (GB)

(*) Notice: Subject to any disclaimer, the term of this patent is extended or adjusted under 35 U.S.C. 154(b) by 1177 days.

(21) Appl. No.: 11/896,710

(22) Filed: Sep. 5, 2007

(65) Prior Publication Data

US 2008/0240914 A1 Oct. 2, 2008

(30) Foreign Application Priority Data

Sep. 27, 2006 (GB) .................................. 0618991.4
Aug. 17, 2007 (GB) .................................. 0716073.2

(51) Int. Cl.
*F02C 9/18* (2006.01)

(52) U.S. Cl. .................................... 415/209.3; 415/192

(58) Field of Classification Search .................. 415/144, 415/145, 183, 192, 208.1, 208.2, 209.3, 209.4; 29/889.7, 889.2, 889.21, 889.22; 60/226.1, 60/226.3

See application file for complete search history.

(56) References Cited

U.S. PATENT DOCUMENTS

| 3,750,397 A * | 8/1973 | Cohen et al. ................ 60/804 |
| 5,592,821 A * | 1/1997 | Alary et al. ................ 60/751 |
| 2006/0045730 A1 | 3/2006 | Durocher et al. |

FOREIGN PATENT DOCUMENTS

| EP | 1 111 246 A1 | 6/2001 |
| GB | 584657 | 1/1947 |
| GB | 610113 | 10/1948 |
| GB | 718138 | 11/1954 |
| GB | 732920 | 6/1955 |
| GB | 789733 | 1/1958 |
| GB | 808655 | 2/1959 |
| GB | 901826 | 7/1962 |
| GB | 1054031 | 1/1967 |
| GB | 2 403 779 A | 1/2005 |

* cited by examiner

*Primary Examiner* — Nathaniel Wiehe
*Assistant Examiner* — Aaron R Eastman
(74) *Attorney, Agent, or Firm* — Oliff & Berridge, PLC

(57) ABSTRACT

An intermediate casing for use in a gas turbine engine comprises inner and outer casing walls 2, 4, a support plate 6, supporting an axial end of each of the casing walls 2, 4, a splitter 8, and an array of vanes 10. At least one of the casing walls 2, 4, the support plate 6, the splitter 8 and the array of vanes 10 is formed from at least one blank of sheet material, such as steel. The formation of one or more components of the assembly from a flat blank of material provides a significant reduction in manufacturing cost.

18 Claims, 4 Drawing Sheets

INTERMEDIATE CASING FOR A GAS TURBINE ENGINE

This invention relates to an intermediate casing for a gas turbine engine.

In order to optimise engine performance, it is considered important to manufacture gas turbine engine components and assemblies with highly accurate geometry and close tolerances. In order to achieve such accuracy, the components are usually cast or forged, and are subsequently finished by machining processes.

An example of a component manufactured in this way is an intermediate casing (or "inter-case") which is positioned between a fan unit exit and a compressor inlet and/or between a low pressure compressor exit and a high pressure compressor inlet. The intermediate casing forms part of the flow path of working fluid through the engine, and imparts swirl to the flow passing through it such that the flow meets the next downstream aerofoil component with an appropriate angle of incidence. In some engines, the intermediate casing may also comprise a flow splitter which divides the air between a core flow and a bypass flow, as well as imparting the desired swirl. Intermediate casings may comprise inner and outer casing walls, a support plate supporting one axial end of each of the inner and outer casing walls, and an array of vanes disposed between the casing walls. The entire casing may be cast whole, including a splitter, if provided, or assembled from accurately shaped components which, themselves, are formed by forging or casting.

Conventional manufacturing processes for such components are complex and highly expensive. For some applications, where the engine is required to have only a short life, or where the performance of the engine does not need to be optimised, the manufacturing accuracy commonly employed, and the associated cost, can be excessive.

According to the present invention there is provided an intermediate casing for a gas turbine engine, the intermediate case comprising inner and outer casing walls, a support plate supporting one axial end of each of the inner and outer casing walls, and an array of vanes disposed between the casing walls, the casing walls and the array of vanes extending circumferentially about an axis of the intermediate casing, characterised in that the casing walls, the support plate and the array of vanes are each formed from at least one blank of sheet material.

Each casing wall may be formed by bending the blank from a flat configuration into an annular configuration, and welding the ends of the blank together.

The intermediate casing may also comprise a splitter disposed between the casing walls and intersecting the array of vanes, the splitter being formed from at least one blank of sheet material which are each bent from a flat configuration to an annular configuration, the ends of the blank being welded together. The rings thus formed are nested one within the other to form a V-shaped cross-section, and are welded together at one axial end, defining the apex of the V-shape.

If the vanes are formed with second and third portions deformed to opposite sides of the plane of a first portion, the first portion may extend between the casing walls upstream of the splitter with respect to the direction of flow of working fluid in normal operation of the engine, the second vane portion being disposed between the outer casing wall and the splitter, and the third vane portion being disposed between the inner casing and the splitter.

Each vane is formed by appropriate deformation of the blank from the flat configuration to a desired aerofoil configuration. The vane may comprise a first portion which extends chordwise over the full width of the vane, and second and third portions which extend from the first portion and are spaced apart from each other in the chordwise direction of the first portion, the second and third portions being deformed to opposite sides of the plane of the first portion.

The first portion of each vane may be located in a notch formed in the upstream edge of the splitter, which may be defined by the apex of the V-shape if the splitter is formed as described above. Each vane may be secured with respect to the splitter by means of a retaining element extending through a hole in the first portion of the vane within the angle of the V-shape. The retaining element may comprise a respective retaining element for each vane, for example in the form of a pin, or it may comprise a common retaining element for all or some of the vanes, for example in the form of a wire extending circumferentially within the splitter.

The support plate supports the axial end of at least one casing wall. The support plate is formed from a blank in a flat configuration by creating at least one aperture in the blank to provide a flow path for working fluid of the engine, while leaving at least one substantially planar annular flange for supporting the casing wall. The blank may also be deformed to provide a plurality of channel-shaped ribs extending radially with respect to the flange.

The sheet material from which the or each component is formed is preferably a metallic material, such as steel or an aerospace alloy.

For a better understanding of the present invention, and to show more clearly how it may be carried into effect, reference will now be made, by way of example, to the accompanying drawings, in which.

Figure 1:
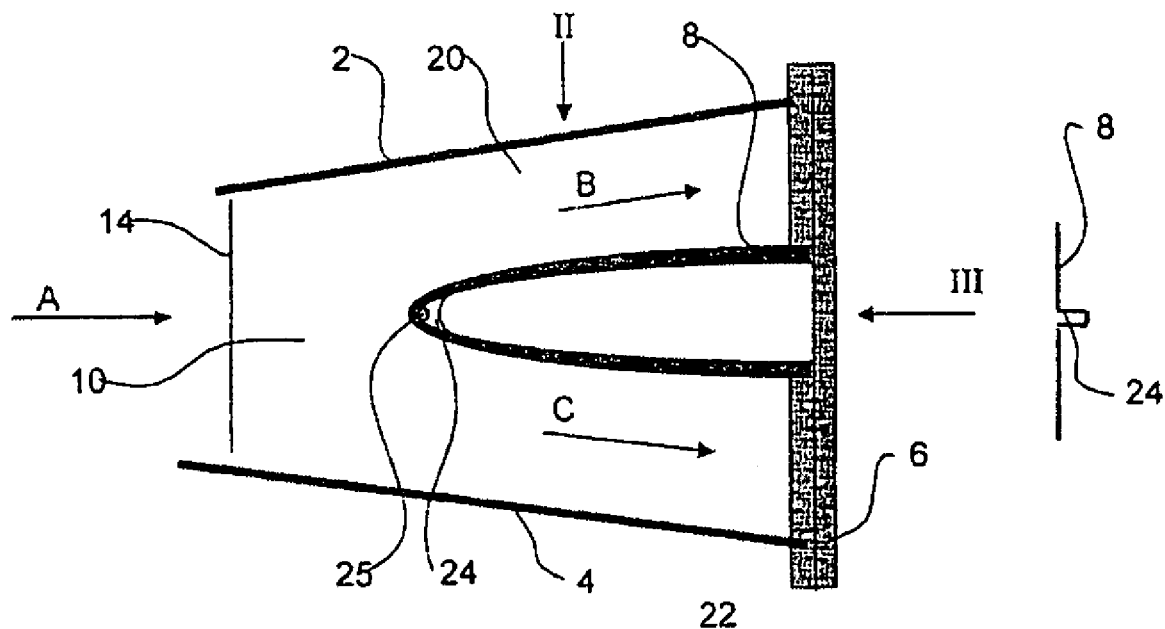
FIG. 1 is a partial sectional view of an intermediate casing for a gas turbine engine.
Figure 6:
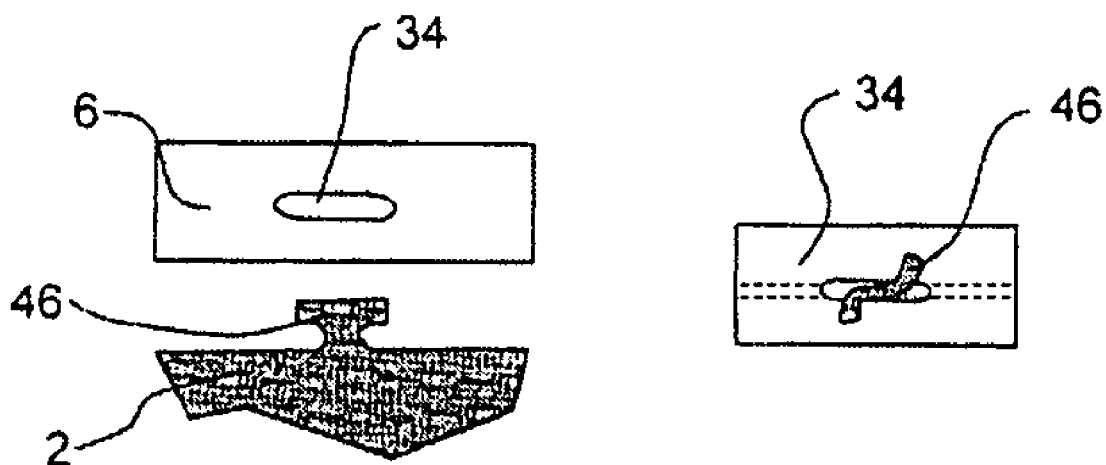
FIG. 6 shows a fastening technique for securing together components of the intermediate casing of FIG. 1.
Figure 7:
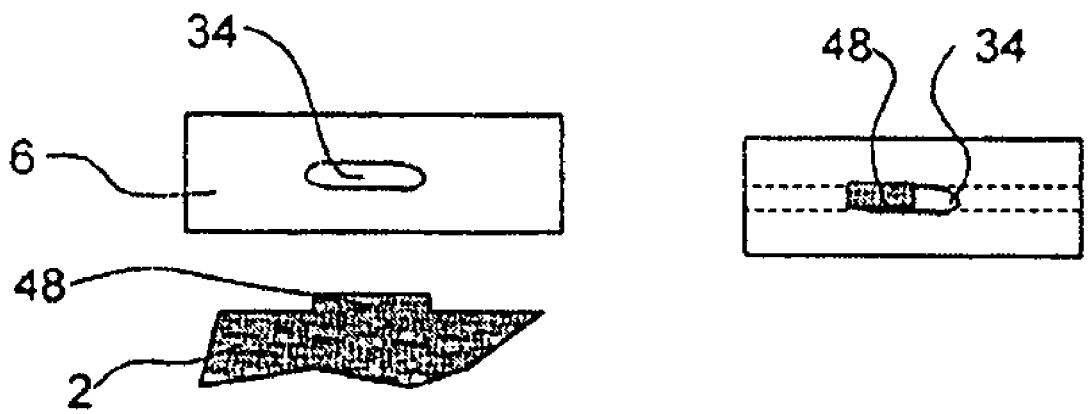
Figure 8:
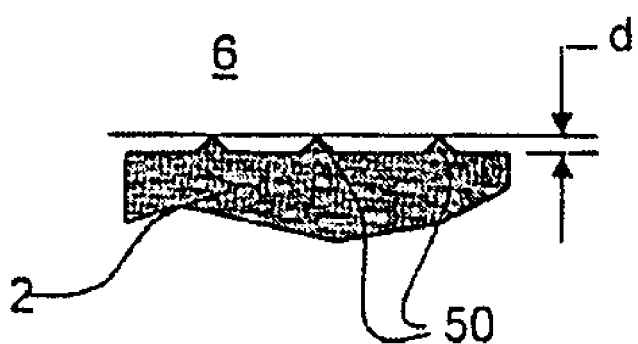

FIG. 7 corresponds to FIG. 6 but shows an alternative fastening technique; and FIG. 8 shows a configuration of a component of the intermediate casing of FIG. 1 for securing by brazing.

FIG. 1 is a cross-section through one half an intermediate casing of a gas turbine engine. The intermediate casing is rotationally symmetrical about the engine axis, which is situated below FIG. 1. The intermediate casing is shown only diagrammatically, and comprises an outer casing wall 2, an inner casing wall 4, a support plate 6, a splitter 8 and an array of vanes 10, of which only one is visible in FIG. 1.

The outer casing wall 2, the inner casing wall 4, the support plate 6, the splitter 8 and each vane 10 are made by appropriately forming sheet metal blanks. The sheet metal blanks, for example the blank 12 from which the vane 10 is formed may be cut by laser to an accurate developed shape from flat steel sheet and subsequently bent or formed into shapes which can be assembled together to form the complete intermediate casing shown in FIG. 1.

Figure 2:
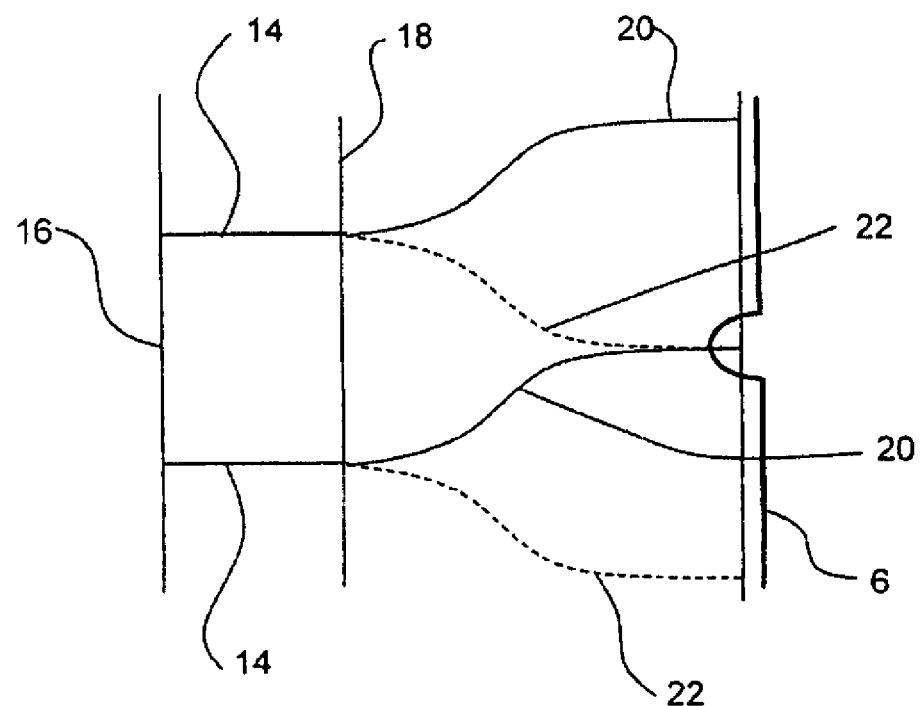
FIG. 2 is a view in the direction of the arrow II in FIG. 1.
Figure 5:
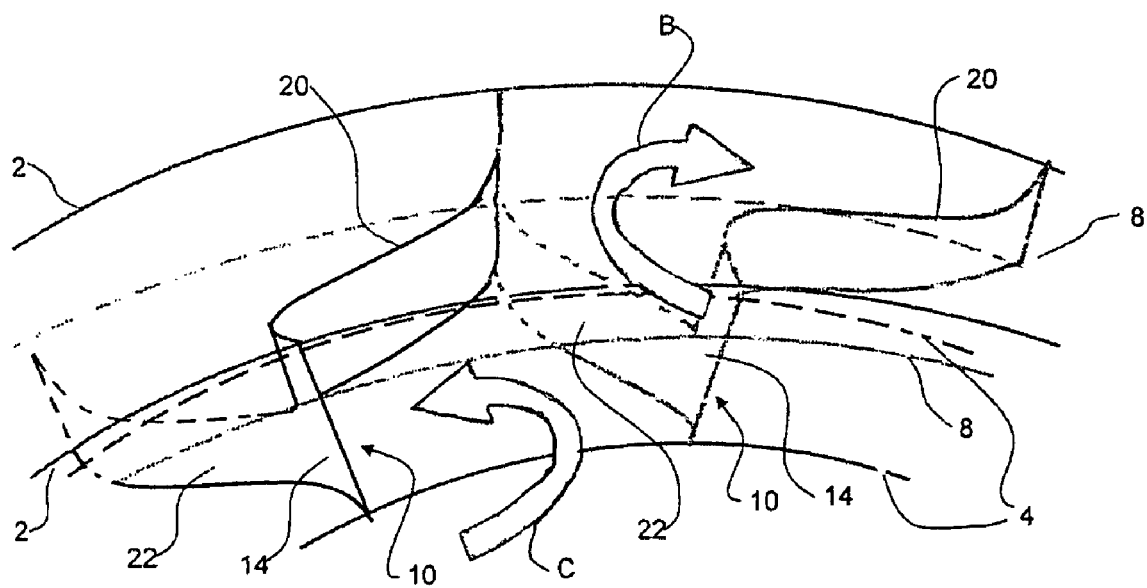
FIG. 5 is a perspective view of the intermediate casing of FIG. 1.

As shown in FIGS. 2 and 5, each vane 10 comprises a first portion 14 which is situated upstream of the splitter 8, with respect to the flow of working fluid in normal operation of the engine, as indicated by an arrow A. In FIG. 2, the upstream edge of the outer casing wall 2 is indicated at 16, and the upstream edge of the splitter 8 is indicated at 18.

It will be appreciated that the first portion 14 of each vane 10 is generally planar and extends substantially between the leading edges 16 and 18 of the outer casing wall 2 and the splitter 8. From the first portion 14, each vane 10 continues in the downstream direction as second and third portions 20, 22 respectively. The second portion extends between the outer casing wall 2 and the splitter 8, while the third portion 22 extends between the splitter 8 and the inner casing wall 6.

Figure 4:
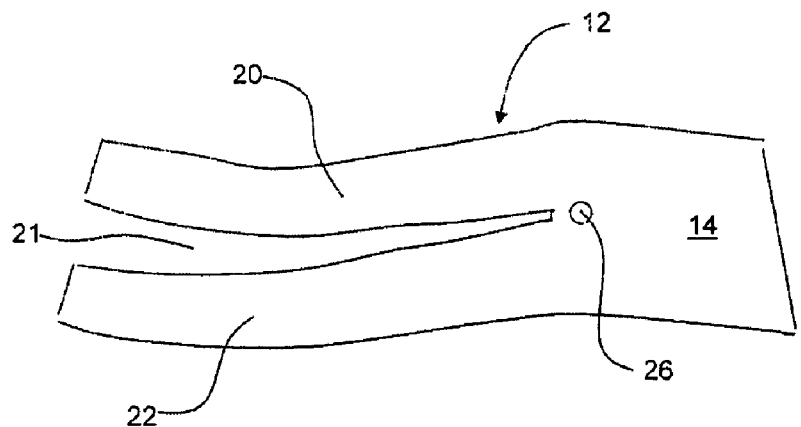
FIG. 4 shows a sheet metal blank from which are formed vanes for the intermediate casing of FIG. 1.

It will be appreciated from FIGS. 2 and 5 that the second portion 20 and the third portion 22 of each vane 10 are deflected in opposite directions from each other. In other words, they extend on opposite sides of the plane of the first portion 14, which, in the embodiment shown in FIG. 4 remains substantially flat after formation of the vane 10 from the blank 12. In alternative embodiments the vane portion 14 may have a convex form. Each vane portion 20, 22 is formed generally as an "S" shape, curving initially to the side of the first portion 14 and then curving again in the reverse direction to an orientation generally parallel to, but circumferentially spaced from, the first portion 14. It will be appreciated from FIG. 4 that the flat blank from which the vane 10 is formed is cut so that, when the vane portions 20, 22 are bent to their desired configurations, these portions fit closely to the inner and outer casing walls 2, 4 and the splitter 8. Thus the blank is provided with a gap 21 between the regions that will form the vane portions 20, 22, to provide a space to accommodate the splitter 8.

In the assembled intermediate casing, the second and third portions 20 and 22 of the vanes 10 define flow passages for the working fluid of the engine. The second portions 20, on the radially outer side of the splitter 8, lie in a bypass flow duct while the third portions 22 lie in a core flow duct. In FIG. 5, arrows B and C respectively represent swirl imparted to the bypass flow and core flow respectively by the second and third portions of the vanes 10. In FIG. 5, the upstream and downstream edges of the outer casing wall 2, the inner casing wall 4 and the splitter 8 are represented only by their upstream and downstream edges. The downstream edges of portions 20, 22 of alternate vanes are radially aligned and thus provide structural support.

As shown in FIGS. 1 and 2, the upstream edge of the splitter 8 has a series of notches 24 (represented diagrammatically to the right of FIG. 1), in which the first portion 14 of the vane 10 is located, at the position between the second and third portions 20, 22. A wire 25 runs within the splitter 8 and extends through holes 26 (FIG. 4) in the vanes 10 in order to secure the vanes 10 with respect to the splitter 8.

As mentioned above, the outer and inner casing walls 2, 4, the support plate 6 and the splitter 8 are formed from flat, laser-cut blanks of sheet metal such as steel. The outer and inner casing walls 2, 4 are of conical form, as shown in FIG. 1, although one or both of them may be cylindrical. The blanks from which they are formed are rolled or otherwise formed into a circular or annular configuration, the abutting ends being joined together by an axially-extending weld to provide a continuous annulus.

Figure 3:
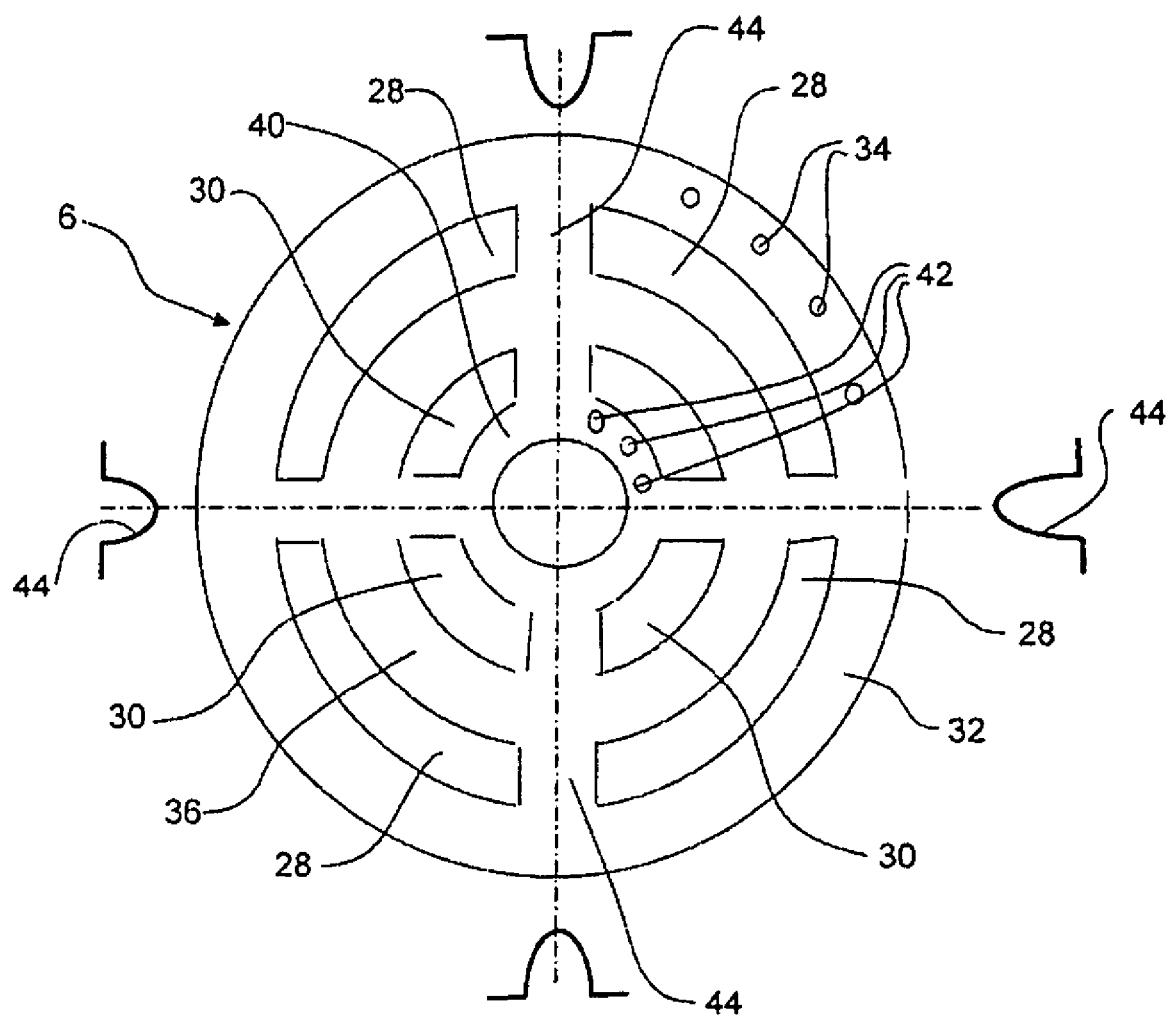
FIG. 3 is a view of a support plate of the intermediate casing taken in the direction of the arrow III in FIG. 1.

The support plate 6 is shown in greater detail in FIG. 3. In the embodiment shown it is formed from a generally circular flat blank of steel sheet, the circle having flats at the 12, 3, 6 and 9 o'clock positions. Arcuate apertures 28, 30 are cut into the sheet which, in the completed engine, receive bypass and core fluid flows B, C respectively. A flange 32, defined between the outer edge of the blank and the apertures 28, is provided to support the outer casing wall 2, and this flange 32 is provided over its circumferential extent with holes 34 for attachment to an adjacent casing (not shown). Between the apertures 28 and 30, there is a flange 36 for supporting the splitter 8, and between the apertures 30 and a central aperture 38 of the support plate 6 there is a flange 40 for supporting the inner casing wall 4. Holes 42, similar to the holes 34, are provided to locate a bearing support/seal assembly (not shown).

The support plate 6 has a plurality of struts 44. As shown at the edges of FIG. 3, the struts 44 have a channel-shaped configuration, bent out from the blank from which the support plate 6 is formed. The struts coincide with the flats on the generally circular steel sheet, and by deforming the sheet to form the struts the steel sheet becomes substantially circular.

The struts 44 thus provide rigidity to the support plate 6 as well as providing channels through which electrical cables, fluid pipes and drive shafts may extend. It will be appreciated that the apertures 30 and 36 are discontinuous at the struts 44 so that the struts 44 extend continuously from the central aperture 38 to the outer edge of the support plate 6, so ensuring that the structural rigidity of the struts 44 is maintained.

The splitter 8 may be formed from two blanks of steel sheet which are each deformed into an annular form with the meeting edges welded together to form a ring. The rings are nested one within the other and then welded together at their upstream edges in order to form a V-shaped configuration as shown in FIG. 1. The rings may be profiled to enhance the aerodynamic properties in the bypass and core flows. In alternative embodiments, in which it is sufficient for the bypass and core flows to be separated from each other without subsequently diverging, it may be sufficient for the splitter 8 to be formed from a single thickness of sheet material, in which case a single blank may be provided.

The notches 24 are provided at the apex of the V with the retaining element or elements 25 situated within this apex.

FIGS. 6 to 8 show different techniques for securing together the components of the intermediate casing shown in FIGS. 1 to 5. As shown in FIG. 6, different components (for example the support plate 6 and the outer casing wall 2) may be interconnected by means of the holes 34 (shown in the form of slots in FIG. 6) into which tabs 46 on the outer casing wall 2 are introduced, after which the tabs 46 are twisted or otherwise deformed, as shown to the right of FIG. 6, to lock the components together. The holes 34 and tabs 46 are preferably formed in or on the blanks from which the support plate 6 and outer casing wall 2 are formed. The S-shaped configuration of the vanes 10 assists in forcing the assembly together in operation of the engine, minimising stress on the tabs 46.

An alternative securing technique is shown in FIG. 7. Again, one component, such as the support plate 6, is provided with the apertures 34, while the other component, for example the outer casing wall 2, is provided with tabs 48. In this instance, the tabs 48 are introduced into the slots 34 and welded, brazed or otherwise secured in a permanent manner.

FIG. 8 shows an alternative securing technique, in which the edge of one component, for example the outer casing wall 2, is provided with spaced projections, for example of triangular form, which abut another component, for example the support plate 6. The projections 50 define a gap having a defined thickness d along which brazing may be performed to secure the components together. The techniques illustrated in FIG. 7 and FIG. 8 may be combined.

In a further alternative securing technique, the support plate 6 is provided with tabs 48 and the other component, for example the outer casing wall 2, is provided with corresponding slots 34.

At the upstream ends of the casing walls 2, 4, the vanes 10 may be located relatively to the casing walls 2, 4 by any suitable means, for example by welding to one or both of the casing walls 2, 4 a flange which may be produced from a rolled blank to provide attachment to upstream components. Alternatively, a support plate similar to the support plate 6 may be provided at the upstream end, in which case the struts corresponding to the struts 44 of the support plate 6 would project in the upstream direction.

Alternatively, one or both of the casing walls 2, 4 may be deformed, for example by bulging or swaging, to provide a locating feature for a V-ring clamp, or a flat washer may be provided with a machined shallow groove to locate the outer or inner casing wall 2, 4. Through slots may be provided, in alignment with the groove, to allow a securing flange to be attached. [The S-shaped configuration of the vanes 10 assists in forcing the assembly together in operation of the engine, minimising stress on the tabs 46]

By manufacturing an intermediate casing from two dimensional flat blanks in the manner described above, substantial cost savings can be made by comparison with conventional manufacturing techniques. In addition, since only relatively simple forming techniques are required, the lead time between the design, of a component and its manufacture can be substantially reduced. Depending on operational requirements, the structural integrity of an assembly made from components formed from inexpensive metal blanks can be enhanced by the selection of appropriate securing techniques, as exemplified by those described with reference to FIGS. 6 to 8.

Although the present invention has been described with primary reference to an intermediate casing, it will be appreciated that similar techniques can be employed to manufacture other components, and in particular other casing parts and assemblies.

The invention claimed is:

1. An intermediate casing for a gas turbine engine, the intermediate casing comprising inner and outer casing walls, a support plate supporting one axial end of each of the inner and outer casing walls, and an array of vanes extending circumferentially about an axis of the intermediate casing, wherein the casing walls, the support plate and the array of vanes are each formed from at least one blank of sheet material.

2. An intermediate casing as claimed in claim 1, wherein each casing wall is formed into an annulus, adjacent ends of the blank being welded together.

3. An intermediate casing as claimed in claims 1, wherein a splitter is provided which is disposed between the inner and outer casing walls.

4. An intermediate casing as claimed in claim 3, wherein the splitter is formed from two blanks of sheet material which are formed into a conical ring, the rings being nestled one within the other and secured together at adjacent annular edges.

5. An intermediate casing as claimed in claim 3, wherein the splitter comprises a pair of annular elements disposed one within the other, the elements being welded together at their adjacent upstream edges and supported by the support plate at their downstream edges.

6. An intermediate casing as claimed in claim 1, wherein each vane comprises a generally planar first portion from which extend second and third portions which are deflected in opposite directions from each other from the plane of the first portion.

7. An intermediate casing as claimed in claim 6, wherein the first vane portion extends between the casing walls at a position upstream of the splitter, and the second vane portion is disposed between the outer casing and the splitter, and the third vane portion is disposed between the inner casing and the splitter.

8. An intermediate casing as claimed in claim 7, wherein the second and third portions of each vane are deflected in opposite directions from each other from the plane of the first portion.

9. An intermediate casing as claimed in claim 7, wherein the first portion of each vane is located in a notch in the upstream edge of the splitter.

10. An intermediate casing as claimed in claim 9, wherein a retaining element engages a region of the first portion disposed within the notch to retain the vane with respect to the splitter.

11. An intermediate casing as claimed in claim 10, wherein the retaining element comprises a respective pin for each vane.

12. An intermediate casing as claimed in claim 10, wherein the retaining element comprises a common retaining element engaging a plurality of the vanes.

13. An intermediate casing as claimed in claim 1, wherein the support plate comprises a circular plate providing planar flanges for supporting the outer casing walls and/or splitter.

14. An intermediate casing as claimed in claim 13, wherein at least one aperture is provided between adjacent flanges for the passage of working fluid during operation of the engine.

15. An intermediate casing as claimed in claims 13, wherein the support plate has at least one strut formed in the blank by deforming the blank into a channel-shaped configuration.

16. An intermediate casing as claimed in claim 1, wherein at least the casing walls and support plate are secured to each other by means of a projecting tab on one of the components which extends into a hole in the other component.

17. An intermediate casing as claimed in claim 16, wherein the tab extends through the hole and is deformed to prevent withdrawal of the tab from the hole.

18. An intermediate casing as claimed in claim 16, wherein the tab extends into the hole and is welded or brazed therein.

* * * * *